United States Patent
Lee et al.

(10) Patent No.: US 9,955,383 B2
(45) Date of Patent: Apr. 24, 2018

(54) METHOD AND APPARATUS FOR TRANSMITTING CELL LOAD INFORMATION IN WIRELESS COMMUNICATION SYSTEM

(71) Applicant: LG ELECTRONICS INC., Seoul (KR)

(72) Inventors: Insun Lee, Seoul (KR); Daewook Byun, Seoul (KR); Jian Xu, Seoul (KR); Kyungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 14/765,925

(22) PCT Filed: Feb. 21, 2014

(86) PCT No.: PCT/KR2014/001416
§ 371 (c)(1),
(2) Date: Aug. 5, 2015

(87) PCT Pub. No.: WO2014/129840
PCT Pub. Date: Aug. 28, 2014

(65) Prior Publication Data
US 2015/0373585 A1  Dec. 24, 2015

Related U.S. Application Data

(60) Provisional application No. 61/767,797, filed on Feb. 22, 2013.

(51) Int. Cl.
*H04W 28/08* (2009.01)
*H04W 24/02* (2009.01)
(Continued)

(52) U.S. Cl.
CPC ......... *H04W 28/085* (2013.01); *H04W 24/02* (2013.01); *H04W 28/08* (2013.01); *H04W 72/0486* (2013.01); *H04W 88/12* (2013.01)

(58) Field of Classification Search
CPC . H04W 24/02; H04W 72/0486; H04W 88/12; H04W 28/085
(Continued)

(56) References Cited

U.S. PATENT DOCUMENTS 8,494,545 B2 * 7/2013 Guo .................. H04W 36/22
455/452.1
2010/0281151 A1 * 11/2010 Ramankutty ......... G06F 15/173
709/223
(Continued)

FOREIGN PATENT DOCUMENTS

KR  10-2011-0123681 A  11/2011
WO  WO 2012/160977 A1  11/2012

*Primary Examiner* — Edan Orgad
*Assistant Examiner* — Emmanuel Maglo
(74) *Attorney, Agent, or Firm* — Birch, Stewart, Kolasch & Birch, LLP

(57) ABSTRACT

A method and apparatus for transmitting cell load information in a wireless communication system is provided. A mobility management entity (MME) of an evolved UMTS terrestrial radio access network (E-UTRAN) system receives cell load information of a cell in a universal mobile telecommunications system (UMTS) system, from a radio network controller (RNC) of the UMTS system, and transmits the received cell load information to a plurality of eNodeBs (eNBs) of the E-UTRAN system, respectively.

13 Claims, 9 Drawing Sheets

(51) Int. Cl.
*H04W 72/04* (2009.01)
*H04W 88/12* (2009.01)

(58) Field of Classification Search
USPC ................................. 455/436, 435.2, 466
See application file for complete search history.

(56) References Cited

U.S. PATENT DOCUMENTS

| | | |
|---|---|---|
| 2011/0092220 A1 | 4/2011 | Bernini et al. |
| 2011/0158184 A1* | 6/2011 | Agulnik ............... H04W 28/18 370/329 |
| 2011/0171952 A1 | 7/2011 | Niu |
| 2011/0294509 A1* | 12/2011 | Kim .................... H04W 36/38 455/436 |
| 2012/0082064 A1* | 4/2012 | Awoniyi ............... H04W 24/10 370/255 |
| 2012/0094669 A1* | 4/2012 | Hapsari ............... H04W 36/385 455/435.2 |
| 2012/0195219 A1 | 8/2012 | Ko et al. |
| 2013/0079009 A1* | 3/2013 | Aumann ............... H04W 16/02 455/436 |
| 2014/0059192 A1* | 2/2014 | Miklos ................. H04W 8/082 709/221 |
| 2015/0111575 A1* | 4/2015 | Lei ....................... H04W 36/08 455/436 |
| 2015/0230063 A1* | 8/2015 | Chandramouli ...... H04W 4/005 455/466 |

* cited by examiner

[Fig. 1]
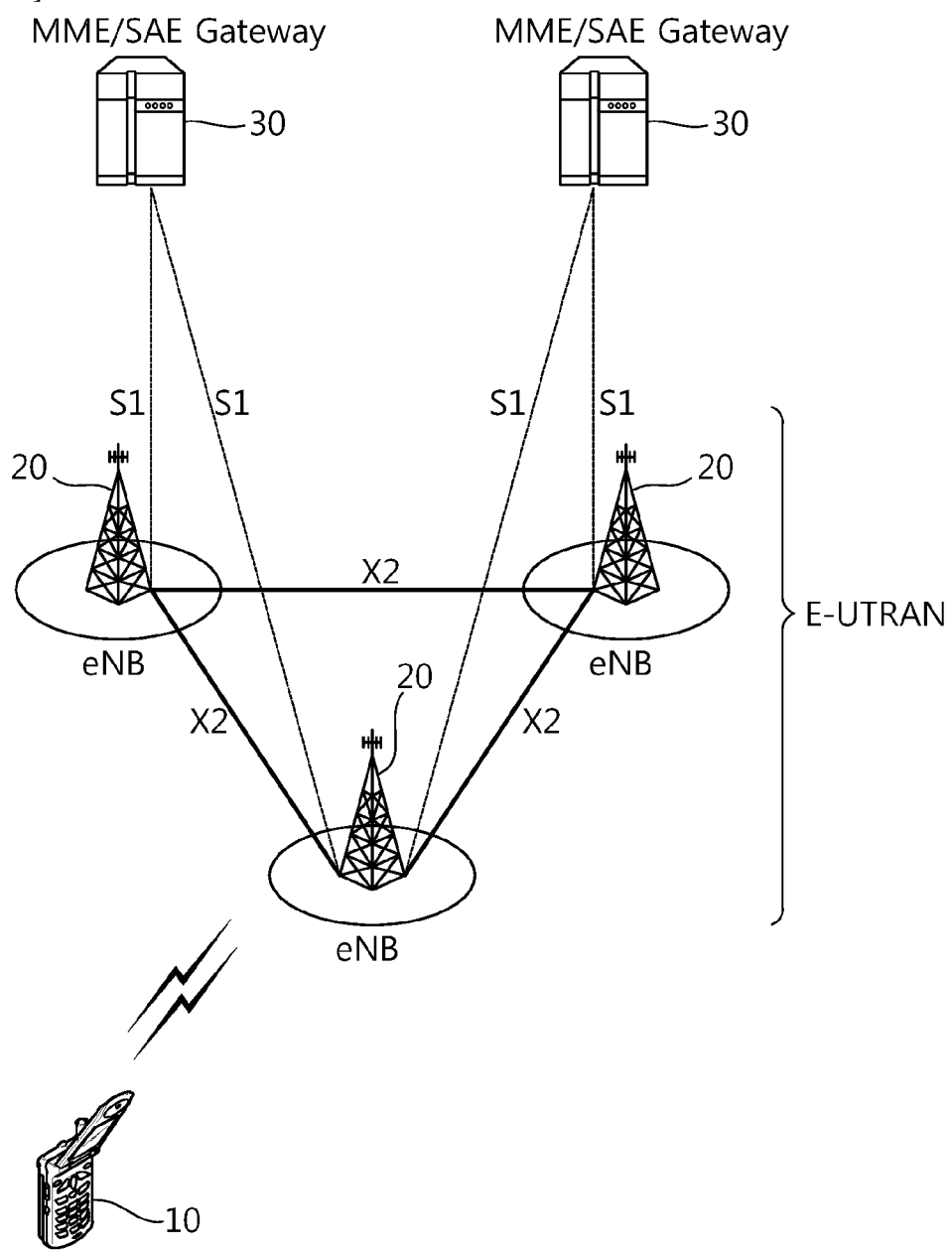

[Fig. 2]
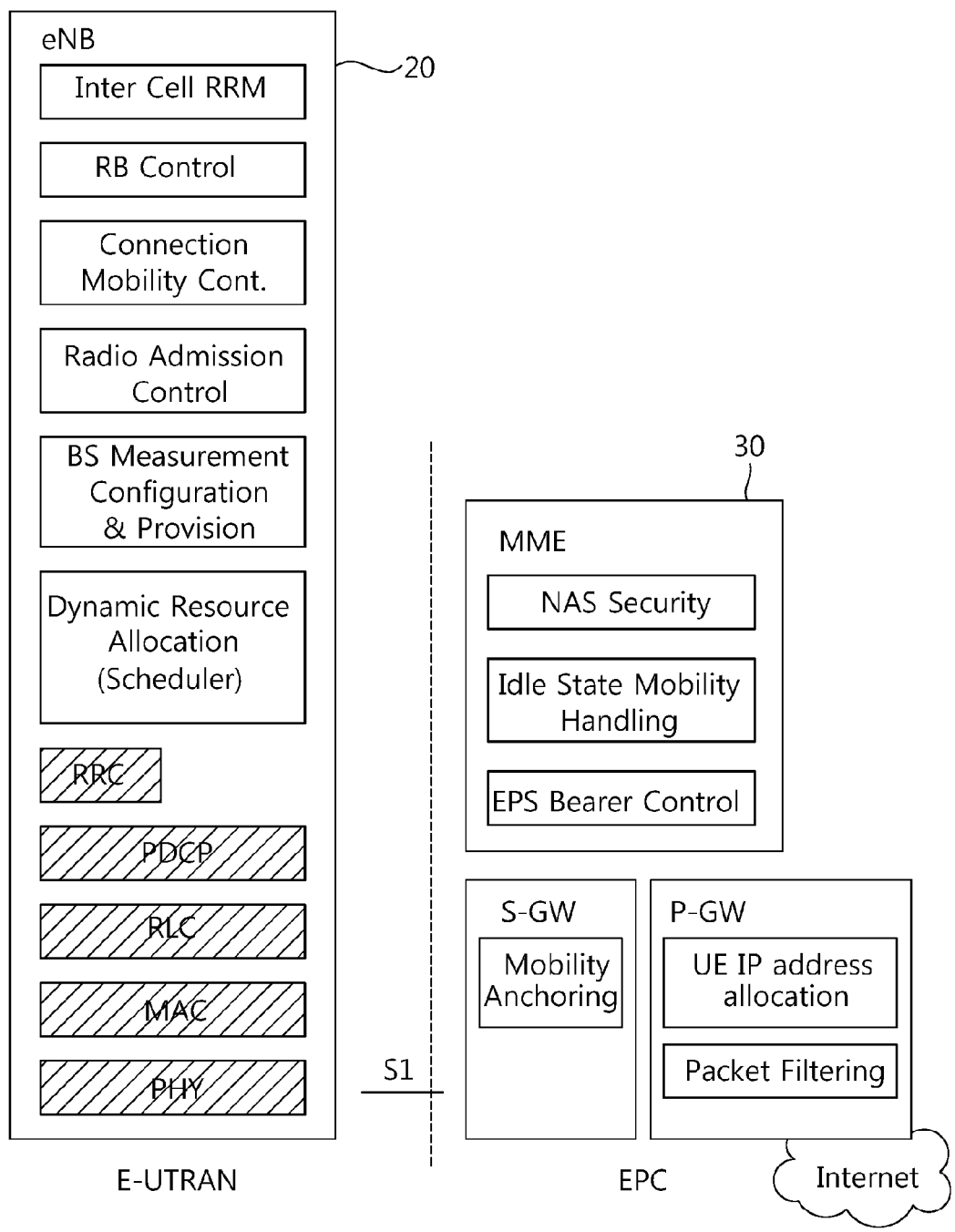

[Fig. 3]
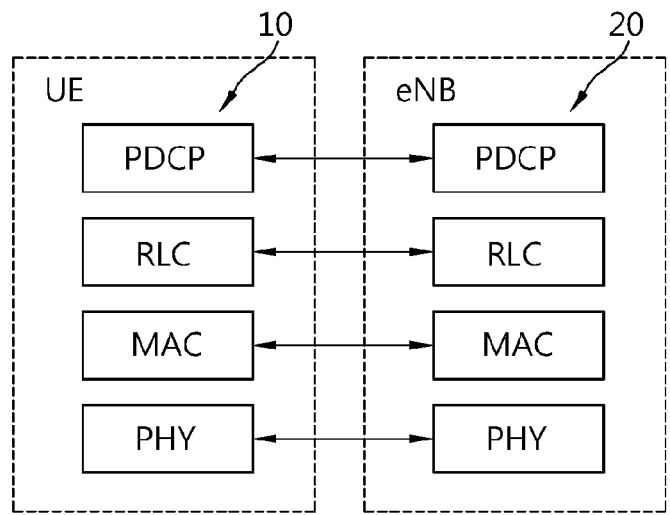
(a)
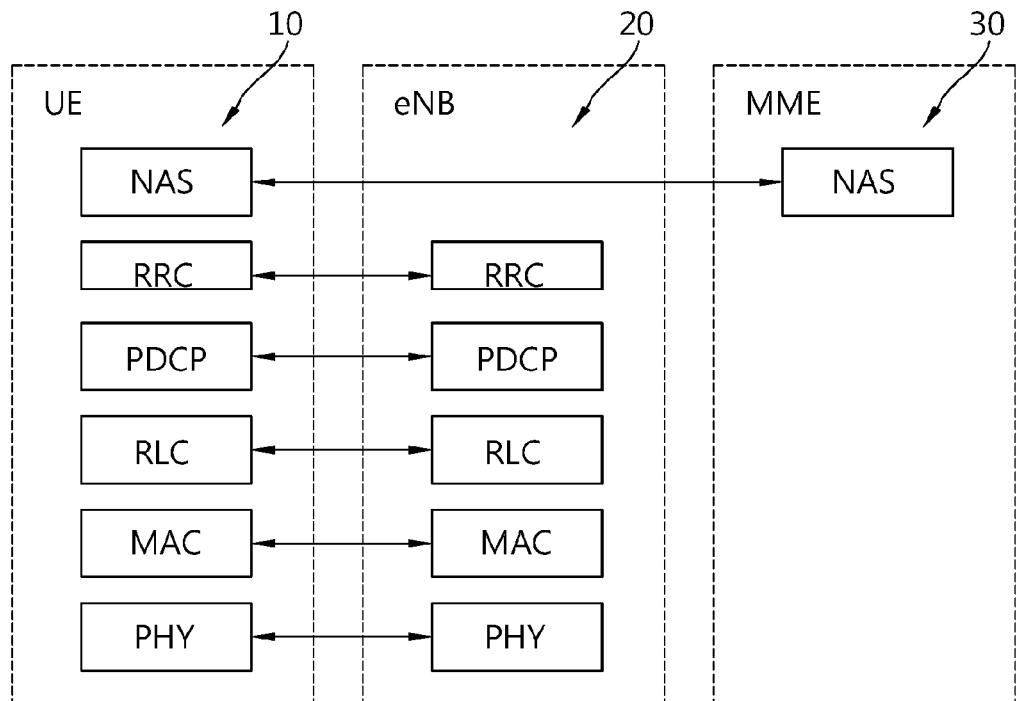
(b)

[Fig. 4]
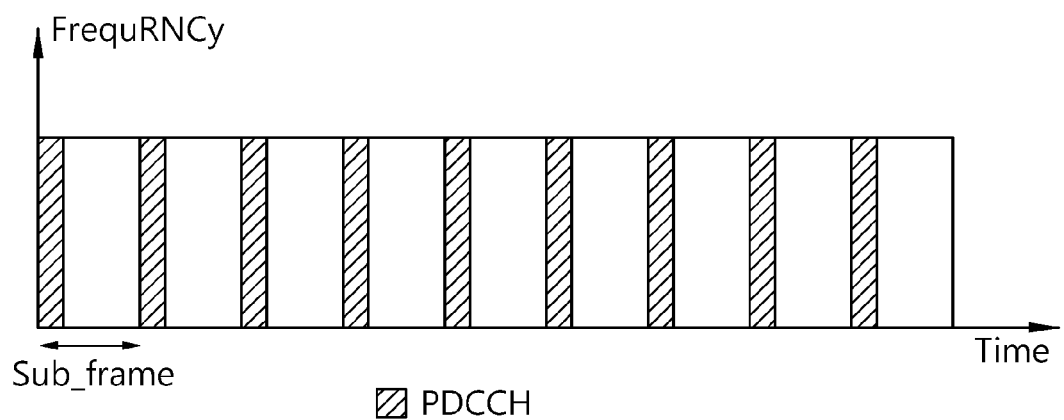

[Fig. 5]
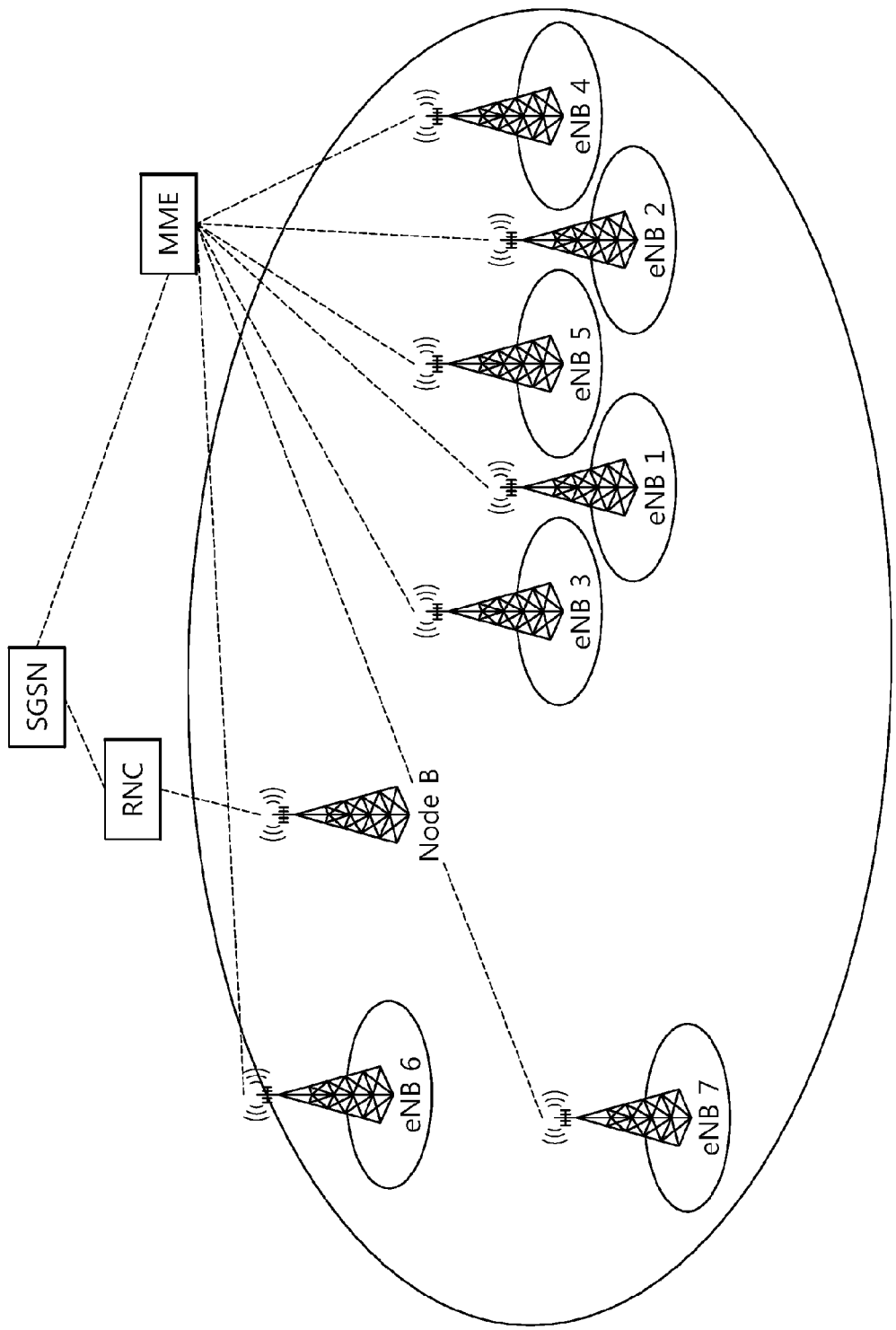

[Fig. 6]
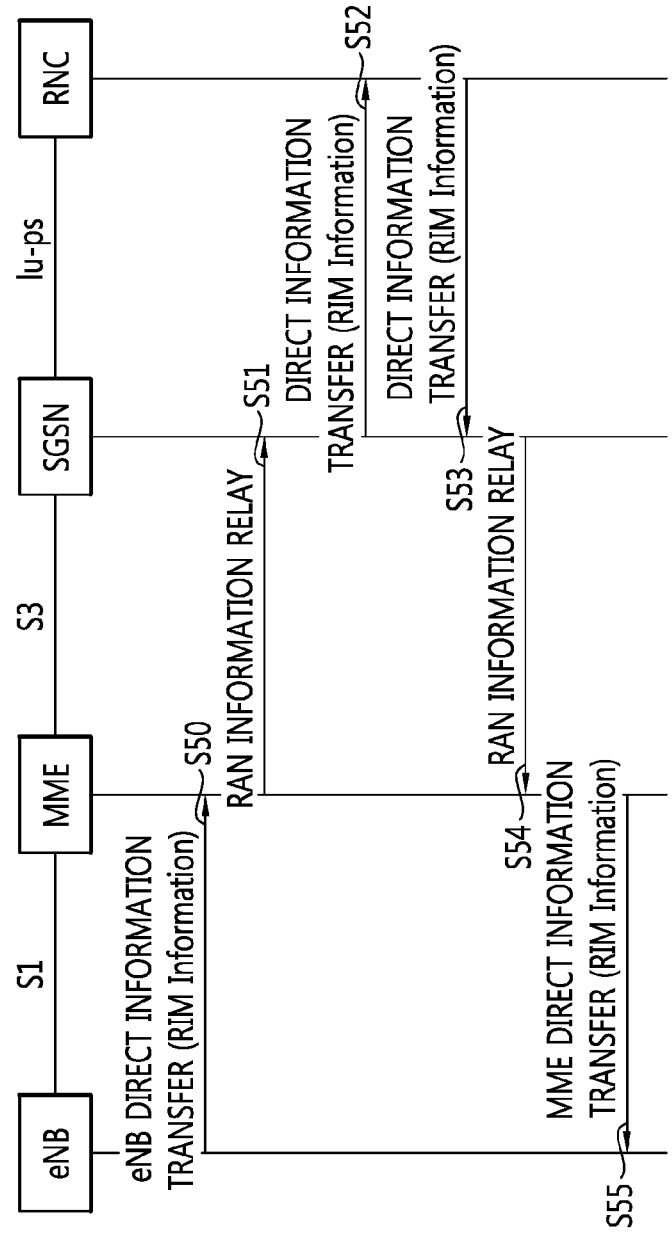

[Fig. 7]
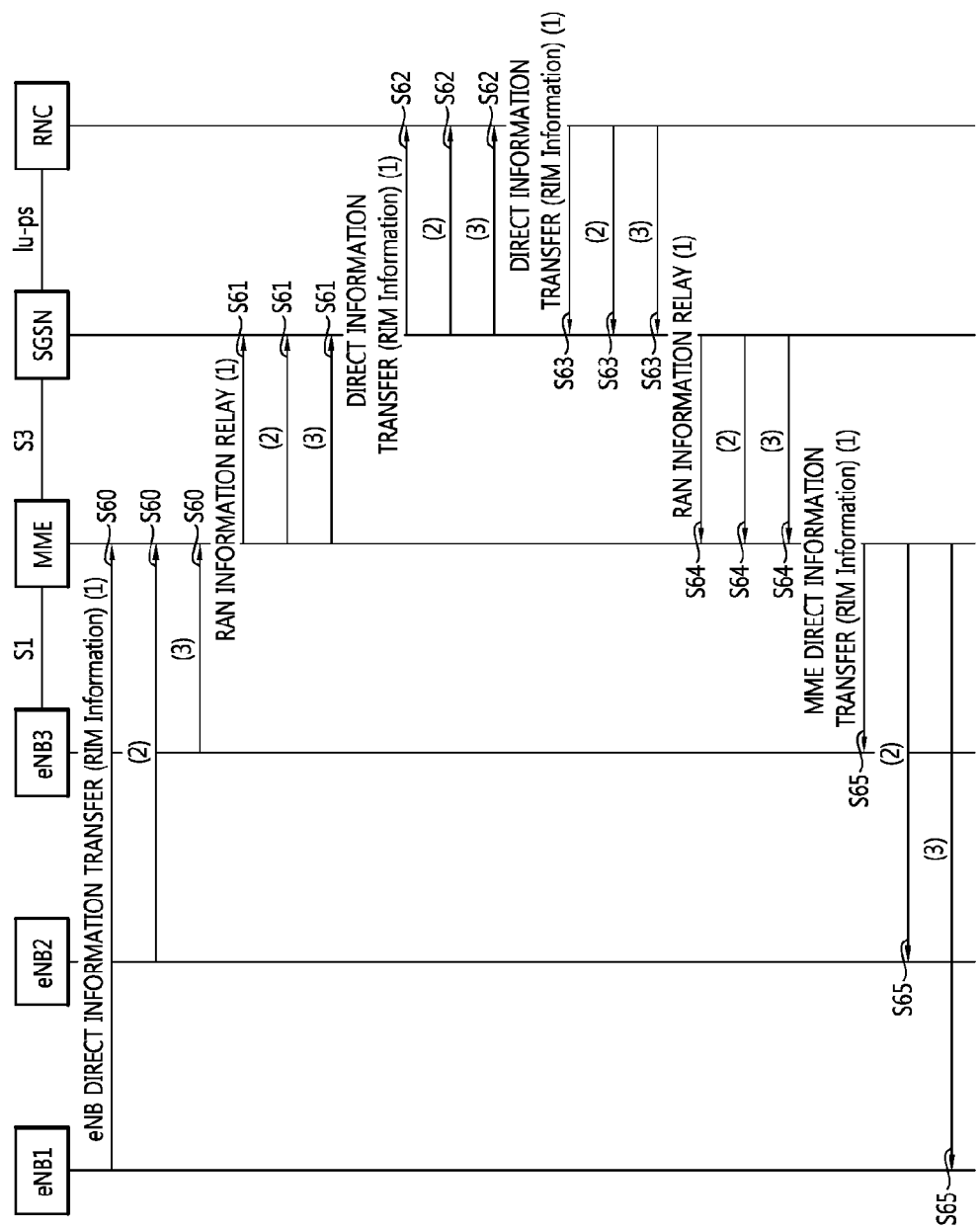
[Fig. 8]
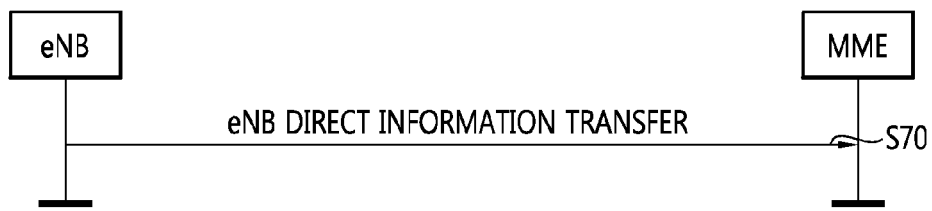

[Fig. 9]
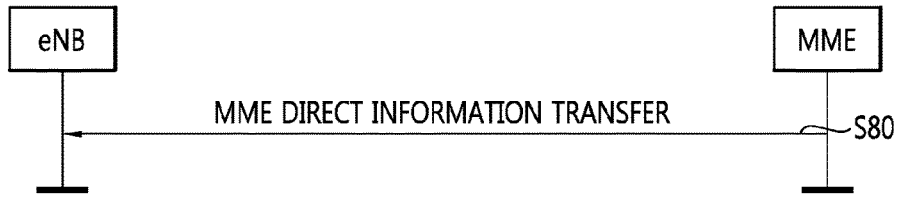
[Fig. 10]
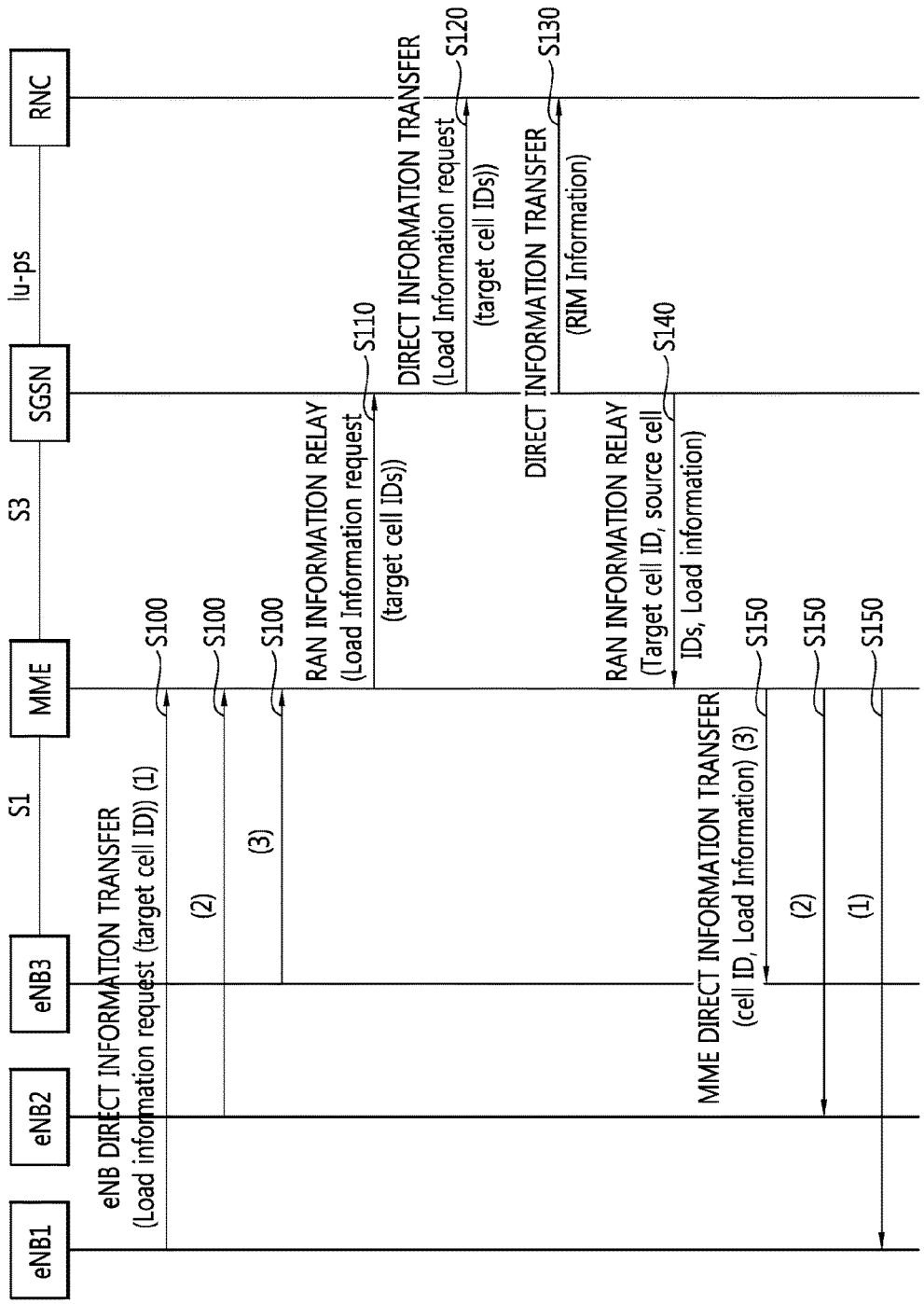

[Fig. 11]
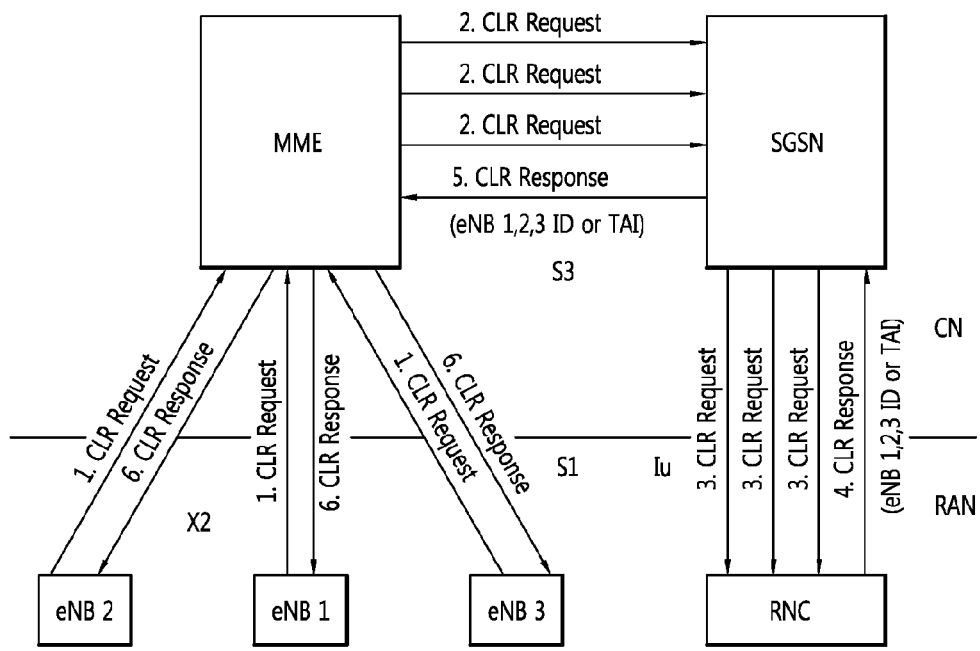
[Fig. 12]
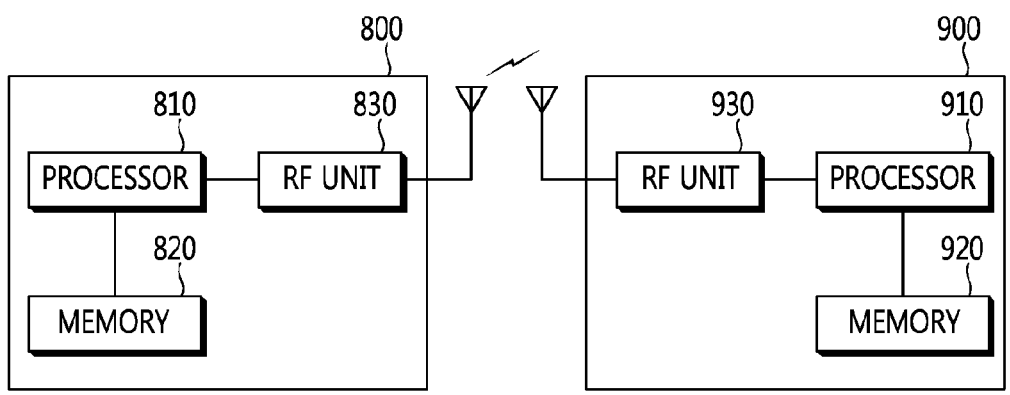

METHOD AND APPARATUS FOR TRANSMITTING CELL LOAD INFORMATION IN WIRELESS COMMUNICATION SYSTEM

CROSS REFERENCE TO RELATED APPLICATIONS

This application is the National Phase of PCT International Application No. PCT/KR2014/001416, filed on Feb. 21, 2014, which claims priority under 35 U.S.C. 119(e) to U.S. Provisional Application No. 61/767,797, filed on Feb. 22, 2013, all of which are hereby expressly incorporated by reference into the present application.

TECHNICAL FIELD

The present invention relates to wireless communication, and more particularly, to a method and apparatus for transmitting cell load information in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As shown in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As shown, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As shown, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer shown in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As shown in FIG. 3(a), the RLC and MAC layers (terminated in an eNB 20 on the network side) may perform functions such as scheduling, automatic repeat request (ARQ), and hybrid automatic repeat request (HARM). The PDCP layer (terminated in eNB 20 on the network side) may perform the user plane functions such as header compression, integrity protection, and ciphering.

As shown in FIG. 3(b), the RLC and MAC layers (terminated in an eNodeB 20 on the network side) perform the same functions for the control plane. As shown, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As shown in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

Long-term coexistence is likely to occur between UMTS/high speed packet access (HSPA) and LTE in one operator's network which places interworking mechanism into a very important position. Currently inter-radio access technology (RAT) handover between UMTS/HSPA and LTE uses relocation procedures. Several small evolutions have been done to make these procedure work better from LTE Rel-8.

However, extensive handover messages and excessive signaling loads in current UMTS/HSPA and LTE interworking may lead to low network efficiency and suboptimal user experience in practical deployments. Such problems could be even more critical in LTE initial deployments (limited LTE coverage) or hotspot type of deployments, leading to frequent inter-RAT handovers and other interoperation procedures.

In order to facilitate multi-RAT deployment and operation, there is a strong need to investigate possible mechanism for seamless UMTS/HSPA and LTE interworking. Besides the enhancement of existing mechanisms, interoperation between two RATs handled by a radio access network (RAN) would be a promising approach in order to benefit mobility performance and reduce impact and resource burden on a core network. Possible performance benefits from RAN level interworking needs to be balanced against the additional impact on network, with reasonable cost guaranteed.

In a situation that the LTE systems are deployed with its capability of carrying explosive mobile traffic, the LTE systems may be deployed in order to improve capacity of specific areas. For this, it is anticipated that pico cells will be deployed or small cells with low power nodes will be deployed for covering hotspot areas. A study item for interworking enhancement of UMTS-LTE has been discussed, and scenarios in which LTE hotspots are deployed in UMTS macro coverage may be discussed. That is, a scenario that E-UTRAN small cells are deployed in traffic hotspots (densely and sparsely) for capacity improvement while a UTRAN macro cell provides full overlapping macro coverage and vice versa may be discussed for interworking enhancement of UMTS-LTE.

An efficient method for interworking of a UMTS macro cell and an LTE small cell may be required.

SUMMARY OF INVENTION

Technical Problem

The present invention provides a method and apparatus for transmitting cell load information in a wireless communication system. The present invention provides a method for reducing network loads in interworking of a universal mobile telecommunications system (UMTS) system and a long-term evolution (LTE) system when LTE small cells and/or pico cells are deployed in coverage of a UMTS macro cell.

Solution to Problem

In an aspect, a method for transmitting, by a mobility management entity (MME) of a first system, cell load information in a wireless communication system is provided. The method includes receiving cell load information of a cell in a second system, from a radio network controller (RNC) of the second system, and transmitting the received cell load information to a plurality of eNodeBs (eNBs) of the first system, respectively.

The cell load information of the cell in the second system may be received using a radio access network (RAN) information relay message via an S3 interface, and the cell load information of the cell in the second system may be received from the RNC via a serving GPRS support node (SGSN).

The cell load information of the cell in the second system may include an identifier (ID) of the cell in the second system.

The cell load information of the cell in the second system may include IDs of the plurality of the eNBs of the first system.

The cell load information of the cell in the second system may include a tracking area identity (TAI) of the plurality of eNBs of the first system.

The received cell load information may be transmitted using an MME direct information transfer message via an S1 interface.

The received cell load information transmitted to each of the plurality of eNBs of the first system may include an ID of each of the plurality of eNBs of the first system.

The method may further include receiving load information requests from the plurality of eNBs of the first system, and transmitting the received load information requests to an SGSN.

The load information requests may be received using an eNB direct information transfer message via an S1 interface.

The received load information requests may be transmitted using a RAN information relay message via the S3 interface.

The load information requests may include an ID of the cell in the second system.

In another aspect, a mobility management entity (MME) of a first system in a wireless communication system is provided. The MME includes a radio frequency (RF) unit for transmitting or receiving a radio signal, and a processor coupled to the RF unit, and configured to receive cell load information of a cell in a second system, from a radio network controller (RNC) of the second system, and transmit the received cell load information to a plurality of eNodeBs (eNBs) of the first system, respectively.

Advantageous Effects of Invention

Signaling overhead of a network for acquiring cell information between heterogeneous systems can be reduced when LTE small cells and/or pico cells are deployed in coverage of a UMTS macro cell.

BRIEF DESCRIPTION OF DRAWINGS

FIG. 1 shows network structure of an evolved universal mobile telecommunication system (E-UMTS).

FIG. 2 shows architecture of a typical E-UTRAN and a typical EPC.

FIG. 3 shows a user-plane protocol and a control-plane protocol stack for the E-UMTS.

FIG. 4 shows an example of structure of a physical channel.

FIG. 5 shows an example of hotspot deployment of LTE small cells with a UMTS macro cell.

FIG. 6 shows an example of a current inter-RAT RIM procedure.

FIG. 7 shows an example of singling overhead according to a current inter-RAT RIM procedure.

FIG. 8 shows an eNB direct information transfer procedure.

FIG. 9 shows an MME direct information transfer procedure.

FIG. 10 shows an example of transmitting load information according to an embodiment of the present invention.

FIG. 11 shows another example of transmitting load information according to an embodiment of the present invention.

FIG. 12 is a block diagram showing wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

On top of an existing macro UMTS system deployment, an LTE system may tend to be deployed as a form of small cells such as pico cells in hotspot areas as an initial type of deployment. By deploying the small cells in a hotspot area, supporting higher capacity for the heterogeneous traffic demand for certain area may result in better performance for users.

Types of hotspots may vary according to density of the small cells or where the hotspot area is located. From the perspective of density for hotspot coverage, the small cells can be deployed densely or sparsely. Also the hotspot area can be formed in outdoor areas such as train stations or busy urban areas, or indoor areas such as, airports, shopping malls, and office buildings.

FIG. 5 shows an example of hotspot deployment of LTE small cells with a UMTS macro cell.

Referring to FIG. 5, a UMTS Node B provides a UMTS macro cell. The Node B is connected with a radio network controller (RNC). Each of eNodeB (eNB)1 to eNB7 provides a hotspot LTE small cell, respectively. eNB 1 to eNB5 are deployed densely in a hotspot area. eNB6 and eNB7 are deployed sparsely in a hotspot area. Each eNB is connected with a mobility management entity (MME). The MME and the RNC is connected via a serving GPRS support node (SGSN).

One of major purposes of hotspot deployment is to boosting up the capacity for the corresponding areas. The indoor data offloading reduces interference with outdoor macro cells, and it can also provide reduction in battery consumption. However, for efficient use of available spectrum, traffic data steering considering load information of macro and pico cells needs to be considered. In the example described in FIG. 5, load balancing between the UMTS macro cell and the hotspot LTE small cells is to be considered for efficient use of overlay networks.

Currently, load balancing for inter-radio access technology (RAT) can be provided using radio access network (RAN) information management (RIM) function for inter-RAT in a self-optimization network (SON). In this procedure, load information is transferred between RAN nodes via a core network.

FIG. 6 shows an example of a current inter-RAT RIM procedure.

At step S50, an eNB transmits an eNB direct information transfer message including RIM information to an MME via the S1 interface. At step S51, the MME transmits an RAN information relay message including the RIM information to an SGSN via the S3 interface. At step S52, the SGSN transmits a direct information transfer message including the RIM information to an RNC via Iu-ps interface. At step S53, the RNC transmits a direct information transfer message including the RIM information to the SGSN via Iu-ps interface. At step S54, the SGSN transmits an RAN information relay message including the RIM information to the MME via the S3 interface. At step S55, the MME transmits an MME direct information transfer message including the RIM information to the eNB via the S1 interface.

However, when the LTE small cells are deployed densely in hotspot areas or may small cells such as pico cells are deployed, heavy signaling overhead may be caused with current RIM procedure. For example, referring to FIG. 5 described above, it is assumed that eNB1, eNB2 and eNB3, among eNB1 to eNB5 deployed in a hotspot area, request load information to the RNC. In this case, each eNB transmits the eNB direct information transfer message to the MME, and therefore, heavy signaling overhead may occur.

FIG. 7 shows an example of singling overhead according to a current inter-RAT RIM procedure.

Referring to FIG. 7, at step S60, eNB1, eNB2, and eNB3 transmit eNB direct information transfer messages including RIM information to the MME via the S1 interface, respectively. At step S61, the MME transmits RAN information relay messages including the RIM information, for the eNB1, eNB2, and eNB3, to the SGSN via the S3 interface. At step S62, the SGSN transmits direct information transfer messages including the RIM information, for the eNB1, eNB2, and eNB3, to the RNC via Iu-ps interface. At step S63, the RNC transmits direct information transfer messages including the RIM information, for the eNB1, eNB2, and eNB3, to the SGSN via Iu-ps interface. At step S64, the SGSN transmits RAN information relay messages including the RIM information, for the eNB1, eNB2, and eNB3, to the MME via the S3 interface. At step S65, the MME transmits MME direct information transfer messages including the RIM information to the eNB1, eNB2, and eNB3 via the S1 interface, respectively.

As describe above, as the number of eNBs increases, signaling overhead increases linearly. Signaling overhead can cause overload on a network.

FIG. 8 shows an eNB direct information transfer procedure. It may be referred to Section 8.13 of 3GPP TS 36.413 V11.2.0 (2012-12).

Referring to FIG. 8, at step S70, the eNB transmits an eNB direct information transfer message to the MME. The purpose of the eNB direct information transfer procedure is to transfer RAN information from the eNB to the MME in unacknowledged mode. The MME does not interpret the transferred RAN information.

FIG. 9 shows an MME direct information transfer procedure. It may be referred to Section 8.14 of 3GPP TS 36.413 V11.2.0 (2012-12).

Referring to FIG. 9, at step S80, the MME transmits an MME direct information transfer message to the eNB. The purpose of the MME direct information transfer procedure is to transfer RAN information from the MME to the eNB in unacknowledged mode. This procedure uses non-user equipment (UE) associated signaling.

A RAN information relay message shall be transmitted on an S3 interface between the SGSN and the MME to transfer RAN information received by the SGSN from a base station subsystem (BSS) or a radio network subsystem (RNS) (or GERAN Iu mode) or by the MME from the eNB. This message shall also be transmitted on an S16 interface to transfer the RAN information between GERAN or GERAN Iu mode or UTRAN. For handling of protocol errors, the RAN information relay message is treated as a response message.

Table 1 shows an example of information elements (IEs) in the RAN information relay message.

TABLE 1

| Information elements | P | Condition/Comment | IE Type | Ins. |
|---|---|---|---|---|
| BSS Container | M | All information elements from the BSSGP RIM PDU, starting from and including the BSSGP "PDU type", shall be contained within the BSS Container and forwarded to the destination MME/SGSN in the RAN Information Relay message. The Container Type shall be set to 2. | F-Container | 0 |
| RIM Routing Address | C | This IE shall be included if the RIM Routing Address information is included in the message sent from the source RAN node. This IE identifies the destination RAN node where the RAN Information needs to be relayed to. It contains: the destination RNC Identity when the target is GERAN Iu mode or UTRAN; or the destination Cell Identity when the target is GERAN; or the Target eNodeB ID when the target is E-UTRAN. | Target Identification | 0 |
| Private Extension | O | None | Private Extension | VS |

Currently, a target cell ID may be included in an RIM information IE including a base station system GPRS protocol (BSSGP) RIM protocol data unit (PDU), and may be delivered transparently between the MME and the SGSN. Accordingly, upon receiving the eNB direct information transfer message, the MME delivers the same to the SGSN. In this case, as the number of eNBs, which provide small cells and/or pico cells and connected to the MME, increases, signaling overhead may increase.

Hereinafter, a method for delivering, by the MME, load information request or load information response to the SGSN by combining load information requests or load information responses received from a plurality of eNBs may be proposed according to an embodiment of the present invention. According to the embodiments of the present invention, a method for delivering load information efficiently without network overloads, when small cells are deployed in hotspot areas densely or sparsely, may be proposed. According to the embodiments of the present invention, overloads due to heavy signaling on the S1 interface between a core network and eNBs/MME can be reduced, when information on cells including load information are exchanged between different RATs in interworking of the UMTS and LTE. The information on cells may include load information and various types of information for interworking of the UMTS and LTE.

FIG. 10 shows an example of transmitting load information according to an embodiment of the present invention.

At step S100, the eNB1, eNB2, and eNB3 transmit eNB direct information transfer messages including a load information request to the MME, respectively. The eNB direct information transfer message may be transmitted via the S1 interface. The load information request may be not included in the BSSGP RIM PDU. The load information request may be included in an additional field of the eNB direct information transfer message. Or, the load information request may be transmitted by using a newly defined message. The load information request may include an identifier (ID) of a UTRAN target cell.

At step S110, upon receiving the eNB direct information transfer messages from the eNB1, eNB2, and eNB3, the MME transmits a RAN information relay message to the SGSN by combining the eNB direct information transfer messages received from the eNB1, eNB2, and eNB3. For receiving the eNB direct information transfer messages from the eNB1, eNB2, and eNB3, the MME may wait for a specific time. The RAN information relay message may be transmitted via the S3 interface. The RAN information relay message may include additional fields, such as a load information request and/or a UTRAN target cell ID. Or, a newly defined message may be used for this purpose.

At step S120, upon receiving the RAN information relay message, the SGSN transmits a direct information transfer message to the RNC. The direct information transfer message may include the load information request and/or the UTRAN target cell ID by using additional fields in the direct information transfer message. Or, a newly defined message may be used for this purpose.

At step S130, the RNC transmits a direct information transfer message to the SGSN, as a response to the direct information transfer message received from the SGSN. The direct information transfer message may include RIM information including the UTRAN cell load information, the UTRAN target cell ID, and source cell IDs (eNB1, eNB2, and eNB3) by using additional fields in the direct information transfer message. Or, a newly defined message may be used for this purpose.

At step S140, upon receiving the direct information transfer message, the SGSN transmits a RAN information relay message to the MME. The RAN information relay message may be transmitted via the S3 interface. The RAN information relay message may include the UTRAN cell load information, the UTRAN target cell ID, and the source cell IDs by using additional fields in the RAN information relay message. Or, a newly defined message may be used for this purpose.

At step S150, upon receiving the RAN information relay message, the MME transmits an MME direct information transfer message including the UTRAN cell load information to the eNB1, eNB2 and eNB3, respectively. The MME direct information transfer message may be transmitted via the S1 interface. The MME direct information transfer message may include a cell ID of each eNB. That is, the MME direct information transfer message transmitted to the eNB1 may include the ID of the eNB1, the MME direct information transfer message transmitted to the eNB2 may include the ID of the eNB2, and the MME direct information transfer message transmitted to the eNB3 may include the ID of the eNB3.

By similar scheme described above in FIG. 10, the RNC of the UMTS system may request cell load information from the LTE small cells. In this case, the SGSN may combine load information requests to be transmitted to the LTE small cells, and deliver the combined load information requests to the MME. The MME may receive cell load information from the LTE small cells, and deliver the received cell load information to the SGSN.

FIG. 11 shows another example of transmitting load information according to an embodiment of the present invention.

Referring to FIG. 11, each eNB requests cell load from the RNC using existing RIM procedure. The RNC transmits one combined RIM load reporting if all the eNBs request the same event threshold. The RNC reports the UTRAN cell load reporting via the RAN information relay message to the MME, and the MME forwards the UTRAN cell load reporting to different eNBs. The MME gets the routing information in the RIM header.

According to the embodiment of the present invention described above, the duplicated event triggering the UTRAN cell load reporting in Iu, S3 interfaces may be reduced. In this embodiment of the present invention, the eNB1, eNB2 and eNB3 request the RNC about the UTRAN cell load information through the MME and the SGSN. No matter the eNBs' requests arrive at the same time or different time, the MME and the SGSN route them one by one. With the received load request from the eNB1, eNB2 and eNB3, if the eNB1, eNB2 and eNB3 request the same report level, when the requested report event happens, the RNC can aggregate the UTRAN cell load information according to the report level. The global eNB ID of the eNB1, eNB2 and eNB3 with the same report level may be involved in the destination address for routing. Besides, if the eNB1, eNB2 and eNB3 share the same tracking area identity (TAI), the TAI can replace the global eNB ID of the eNB1, eNB2, and eNB3 in the destination address for routing. With the received UTRAN cell load information from the RNC, the MME should understand the new destination address including the multiple eNB global IDs or TAI and distributes the UTRAN cell load information to the eNBs indicated by the global eNB ID or to the TAI over the S1 interface according to the routing information.

In order to distribute the UTRAN cell load information to multiple eNBs, the MME is impacted to be able to understand the new destination address included in the RIM PDU, i.e. multiple target global eNB IDs or TAI, comparing to one target global eNB ID in the current destination address. The signaling reduction level depends on the number of eNBs with the same requested report level. In addition, the MME may not aggregate the load request, because in most cases, the eNB1, eNB2 and eNB3 may transmit requests to the MME in different time.

FIG. 12 is a block diagram showing wireless communication system to implement an embodiment of the present invention.

An eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An MME or an eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting, by a mobility management entity (MME) of a long term evolution (LTE) system, cell load information in a wireless communication system, the method comprising:

receiving a plurality of load information requests for requesting cell load information of a cell in a universal mobile telecommunications system (UMTS), from a plurality of evolved Node Bs (eNBs) of the LTE system;

generating a combined load information request by combining the plurality of load information requests received from the plurality of eNBs of the LTE system during a specific time;

transmitting the combined load information request to a serving general packet radio services (GPRS) support node (SGSN);

receiving the cell load information of the cell in the UMTS in response to the combined load information request, from a radio network controller (RNC) of the UMTS; and transmitting the received cell load information to the plurality of eNBs of the LTE system, respectively.

2. The method of claim 1, wherein the cell load information of the cell in the UMTS is received by the SGSN from the RNC, and wherein the MME receives the cell load information included in a radio access network (RAN) information relay message transmitted by the SGSN to the MME via an S3 interface.

3. The method of claim 1, wherein the cell load information of the cell in the UMTS includes an identifier (ID) of the cell in the UMTS.

4. The method of claim 1, wherein the cell load information of the cell in the UMTS includes identifiers (IDs) of the plurality of the eNBs of the LTE system.

5. The method of claim 1, wherein the cell load information of the cell in the UMTS includes a tracking area identity (TAI) of the plurality of eNBs of the LTE system.

6. The method of claim 1, wherein the received cell load information is transmitted using an MME direct information transfer message via an S1 interface.

7. The method of claim 1, wherein the received cell load information transmitted to each of the plurality of eNBs of the LTE system includes an identity (ID) of each of the plurality of eNBs of the LTE system.

8. The method of claim 1, wherein the plurality of load information requests are received using an eNB direct information transfer message via an S1 interface.

9. The method of claim 1, wherein the combined load information request is transmitted using a radio access network (RAN) information relay message via an S3 interface.

10. The method of claim 1, wherein the plurality of load information requests include an identity (ID) of the cell in the UMTS.

11. A mobility management entity (MME) of a long term evolution (LTE) system in a wireless communication system, the MME comprising:

a radio frequency (RF) unit that transmits or receives a radio signal; and a processor, coupled to the RF unit, that:

controls the RF unit to receive a plurality of load information requests for requesting cell load information of a cell in a universal mobile telecommunications system (UMTS), from a plurality of evolved Node Bs (eNBs) of the LTE system, generates a combined load information request by combining the plurality of load information requests received by the RF unit from the plurality of eNBs of the LTE system during a specific time, controls the RF unit to transmit the combined load information request to a serving general packet radio services (GPRS) support node (SGSN), controls the RF to receive the cell load information of the cell in the UMTS in response to the combined load information request, from a radio network controller (RNC) of the UMTS, and controls the RF unit to transmit the received cell load information to the plurality of eNBs of the LTE system, respectively.

12. The MME of claim 11, wherein the cell load information of the cell in the UMTS is received by the SGSN from the RNC, and wherein the MME receives the cell load information included in a radio access network (RAN) information relay message transmitted by the SGSN to the MME via an S3 interface.

13. The MME of claim 11, wherein the received cell load information is transmitted using an MME direct information transfer message via an S1 interface.

* * * * *